United States Patent
Cheng et al.

(10) Patent No.: US 7,097,064 B2
(45) Date of Patent: Aug. 29, 2006

(54) DOUBLE WALL COOKING VESSEL

(75) Inventors: Stanley Kin Sui Cheng, Vallejo, CA (US); Roberto Tarenga, Milan (IT)

(73) Assignee: Meyer Intellectual Properties Limited, (VG)

( * ) Notice: Subject to any disclaimer, the term of this patent is extended or adjusted under 35 U.S.C. 154(b) by 178 days.

(21) Appl. No.: 10/766,221

(22) Filed: Jan. 28, 2004

(65) Prior Publication Data

US 2005/0161458 A1 Jul. 28, 2005

(51) Int. Cl.
*A47J 27/00* (2006.01)
*A47J 36/02* (2006.01)

(52) U.S. Cl. .................. 220/573.1; 220/62.17

(58) Field of Classification Search ............. 220/4.26, 220/4.27, 62.16, 62.17, 573.1, 626; 126/246, 126/390.1; 29/505, 514, 521
See application file for complete search history.

(56) References Cited

U.S. PATENT DOCUMENTS

| | | | |
|---|---|---|---|
| 3,837,330 A * | 9/1974 | Lanigan et al. | 126/246 |
| 4,204,609 A | 5/1980 | Kuhn | |
| 4,646,935 A * | 3/1987 | Ulam | 220/573.1 |
| 4,790,292 A | 12/1988 | Kuhn | |
| 5,307,951 A | 5/1994 | Kuhn | |
| 5,348,187 A | 9/1994 | Schultz | |
| 6,073,545 A | 6/2000 | Huppi et al. | |
| 6,267,830 B1 * | 7/2001 | Groll | 148/531 |
| 2003/0160053 A1 * | 8/2003 | Kim | 220/573.1 |

FOREIGN PATENT DOCUMENTS

| | | |
|---|---|---|
| EP | 752295 B1 | 1/2000 |
| GB | 2 034 173 A | 6/1980 |
| GB | 2333027 A | 7/1999 |
| JP | 2002-070118 A | 3/2000 |

* cited by examiner

*Primary Examiner*—Nathan J. Newhouse
*Assistant Examiner*—Harry Grosso
(74) *Attorney, Agent, or Firm*—Edward S. Sherman

(57) ABSTRACT

A dual wall cooking vessel is formed by the impact or friction bonding of the an inner to an outer vessel wherein a laminate of aluminum and copper layers is disposed between the outer surface of the bottom of the inner vessel and the inner surface of the bottom of the outer vessel. The aluminum layers are arranged to surround the copper layer of the uppermost aluminum layer being the upper aluminum layer being thinner than the lower aluminum layer and having a slightly smaller diameter than the copper and aluminum layer. The appropriate dimensions of the aluminum layers and sequence of welding and bonding operation results in the co-extrusion of both aluminum layers into a portion of the adjacent sidewall formed by the gap between the walls of the inner and outer vessel. This co-extruded layers of aluminum within the side walls and the bottom of the vessel improves the heat transfer from the outer vessel to the inner vessel during cooking, but without significantly diminishing the insulating properties of the dual wall vessel that serve to keep the food warm while it is being served.

22 Claims, 7 Drawing Sheets

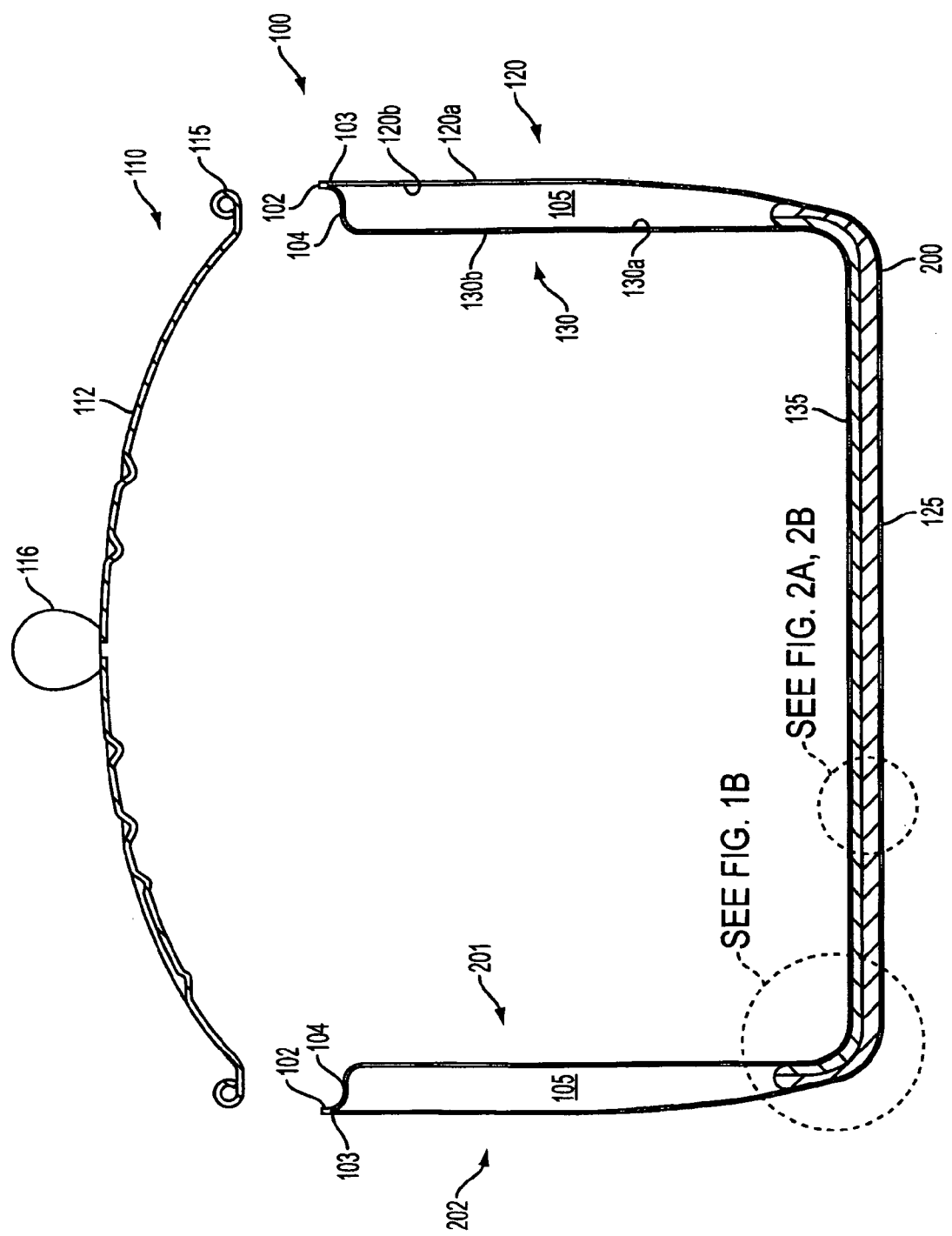

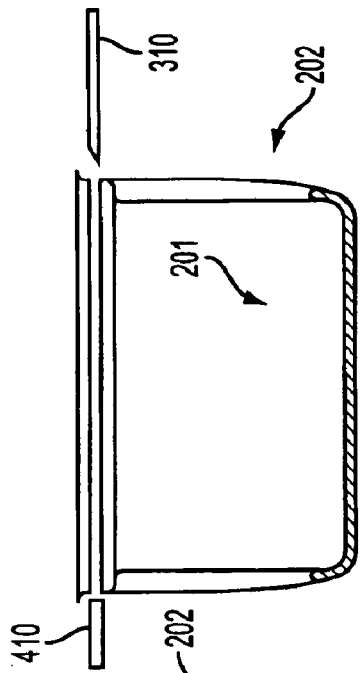
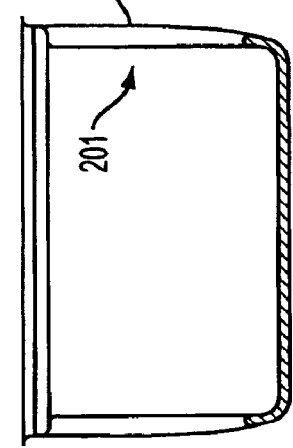
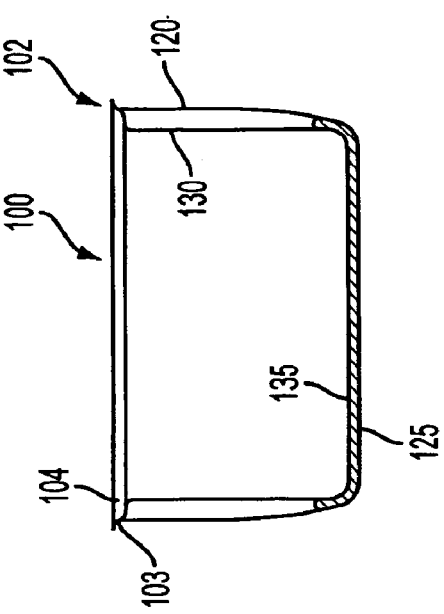
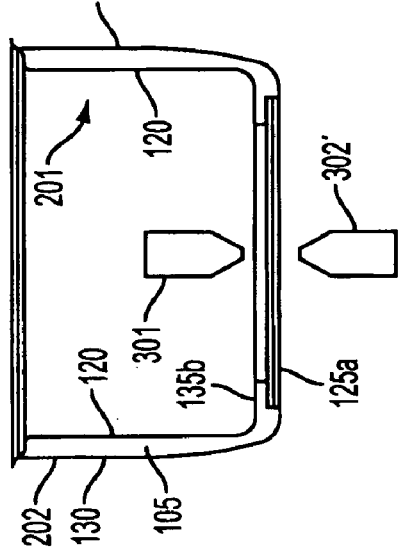
FIG. 3D
FIG. 3E
FIG. 3F
FIG. 3G

DOUBLE WALL COOKING VESSEL

BACKGROUND OF INVENTION

The present invention relates to improved cooking vessels, particularly to double wall cooking vessels.

Double wall cooking vessels have a solid bottom surface and a pair of concentric co-axial sidewalls separated by an air gap there between. The double wall construction provides insulation so that the food stays warm after cooking, permitting the same cookware to be used as serving ware at the table.

Also known in the art is "waterless cookware", that is a cooking vessel with a self-sealing lid so that a minimum of water is used to cook the food, with the steam generated from the added water and the foodstuff itself is retained, rather than lost through the gap between the vessel's rim and cover. The extreme example of "waterless cookware" is a pressure cooker, in which a pressure containing cooking vessel has a match lid that locks to secure a gasket between the rim and the lid. The lid must have a pressure release valve, lest the internal pressure cause a violent explosion of the vessel. The other form of "waterless cookware" involves a pot or vessel rim that extends outward from the vessel's perimeter to provide a slightly concave region where steam can condense between the extended rim and the matching lid, thus forming a "water" seal in placed of the rubber gasket in the pressure cooker. The mass of the lid serves as a "release valve" preventing excess pressure within the confined volume that holds the foodstuff. Both forms of "waterless cooking" are popular as they offer a superior method of preserving vitamins, nutrients and natural flavors, creating a more pleasing an uniform texture to the cooking food than microware methods.

Double wall cookware however has certain disadvantages. The contained wall must be sealed from water for the expected lifetime of the product, as any water that enters or seeps in during use or washing presents a hazard when covert to steam during cooking. Thus the cookware is difficult to manufacture, as well as costly.

Dual wall cookware also suffers in performance relative to single wall cooking vessels, as the outer surface near the bottom of the vessels is easily overheated during cooking, being insulated from the remainder of the vessel. This rapidly leads to discoloration, and distortion under extreme conditions, making the cookware unattractive for use at the table, or display in the kitchen.

Accordingly, there is a need for an improved dual wall cooking vessel and method of making the same that overcomes the aforementioned disadvantages, and in particular making the vessel suitable use a "waterless cookware".

It is therefore a first object of the present invention to provide an improved construction for dual wall cookware.

It is a further object for providing a reliable and cost effective method of making such an improved construction, that results in a complete an secure seal at the rim where the inner and outer walls meet.

It is a further object of the invention that the securely sealing rim be suited shaped so that the vessel may serve as waterless cookware with the appropriate matching lid.

SUMMARY OF INVENTION

In the present invention, the first object is achieved by constructing the dual wall cookware in a manner that the lower portion of the dual adjacent the bottom of the pan is filled with a thermally conductive material.

Another object of the invention is achieved by filling the lower wall portion with aluminum during the forming of the pan and attachment of a thermally conductive bottom deployed for generating a uniform temperature profile over the interior bottoms that serves as the cooking, or foodstuff contact surface.

The object of achieving a suitable rim for waterless cooking is to align and weld the bottoms of the inner and outer vessels, that form the dual walls, together before friction bonding them together. This results in the precise alignment of the a previously formed inner and outer rim portions that can be consistently welded together to form the water tight seal between the inner and outer wall.

The above and other objects, effects, features, and advantages of the present invention will become more apparent from the following description of the embodiments thereof taken in conjunction with the accompanying drawings.

BRIEF DESCRIPTION OF DRAWINGS

FIG. 1A is a cross-sectional elevation of a first embodiment of a dual wall cooking vessel.

FIG. 3A–3G illustrate via a sequence of cross-sectional elevations the steps used to construct the dual wall cooking vessel of FIG. 1.

DETAILED DESCRIPTION

Figure 1B:
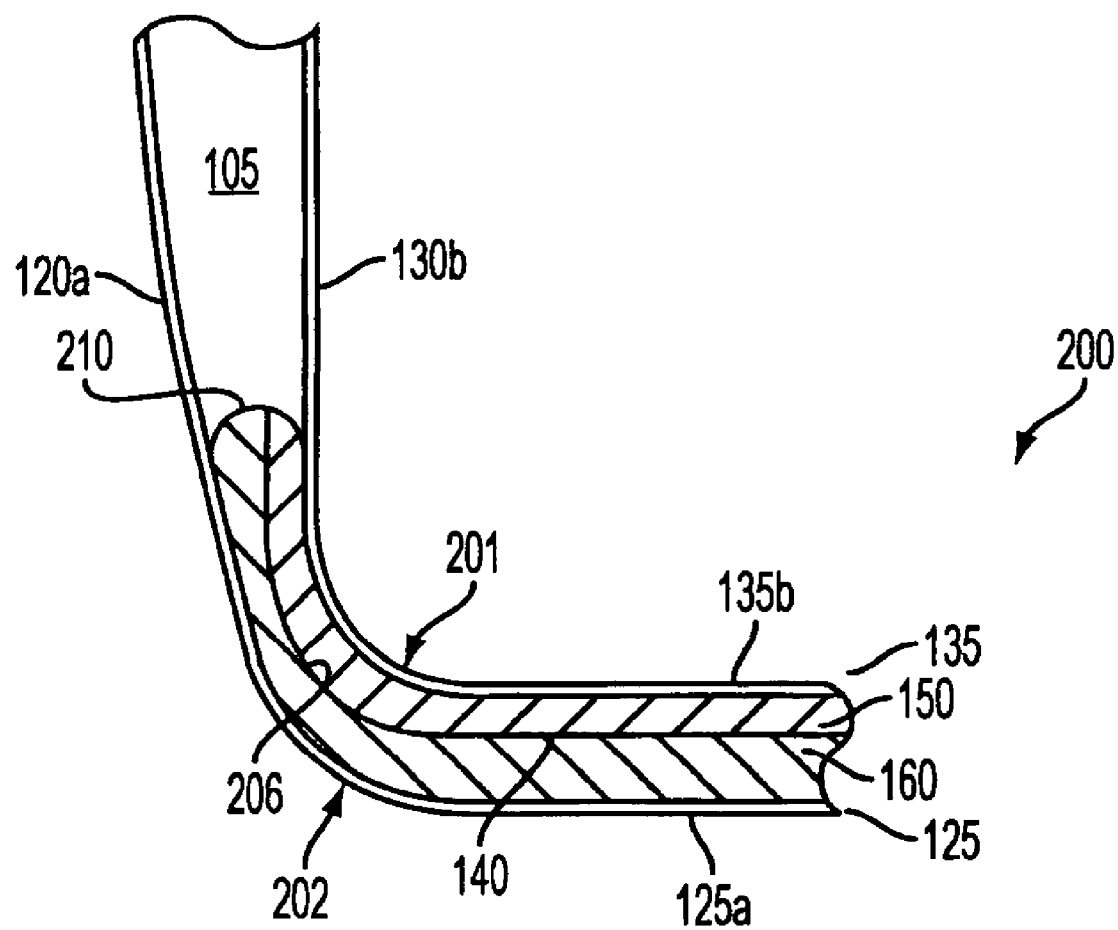
FIG. 1B is an expanded view of a portion of FIG. 1A.

In accordance with the present invention, FIG. 1 illustrates . . . thermally conductive material is interposed between inner pan 135 and outer pan 125 encompassing the bottom 200 of vessel 100. However, by fabricating the vessel 100 according to the teachings of this invention the thermally conductive material extends upward to fill the lower portion of the cavity 105 separating the outer surface 130a of the upright wall 130 of the inner pan 202 and the inner surface 120b of the upward wall 120 of the outer pan 201. As illustrated in the expanded view in FIG. 1B, marked as A, the thermally conductive material in this preferred embodiment comprises at least three layers of materials. The first layer 150 is in contact with the outer surface 135a of the inner pan, having the opposing side in contact with a middle or second layer 150. The other side of the middle layer 150 is in contact with the a first surface of the third layer 160, the other surface of layer 160 being contact with the inner surface 125b of the outer pan. As will be further illustrated with reference to FIG. 2, the middle layer generally does not extend upward into the cavity 105, thus layers 150 and 160 are connected over the extent of the cavity 105 which they partially fill, terminating at an edge 210, having a common interface therein 206. Layers 150 and 160 are preferably aluminum, or a suitable allow thereof, and surround a middle layer 150 comprising copper or a suitable allow thereof. The middle copper layer, being more thermally conductive than the surrounding aluminum layers transfer heater laterally from layer 160, such that the temperature across the inside bottom surface 135b of the inner pan 202 is uniform for cooking foodstuff, thus accommodating a range of heating methods and burner or flame configures used to heat the vessel 100 from the bottom of surface of the outer pan 125a.

Referring back to FIG. 1A, the cooking vessel has an upper rim 102 formed at the termination of the edge 103 of the outer upper wall 120, with edge 104 of the inner upper wall 130. Edges 104 and 103 are preferably welded together during fabrication to prevent water from seeping in or entering cavity 105. The heat from cooking would rapidly vaporize a small quantity of water trapped in cavity 105, which may present a hazard or damage the vessel 100 in escaping rapidly therefrom. Further, edge 104 flairs outward in a substantially horizontal direction before terminating at the contact point with upper end of the inner wall 130, thus forming a sealable surface for receiving lid 110. Lid 110 has a domelike central region 112 terminating at its periphery with an edge 115 that conforms to the shape of rim 104. A slight upward facing concavity in rim 104 provides for the collection of condensed moisture therein, thus providing a sealing liquid between rim 102 and lid 110 to form a so called "waterless" cooking vessel. Lid 110 is illustrated as including an optional handle or knob 166 for ease of placement and removal from vessel 100. It should be noted that the outward extending flair of rim portion 104 also approximately defines the width of cavity 105, as wall section 103 extends in the substantially vertical direction where it intersect rim 104 at edge 102. Dual wall cooking vessel 100 also preferably includes one or more handles (not shown) disposed on the exterior side surface for grasping during cooking or serving.

Figure 2A:
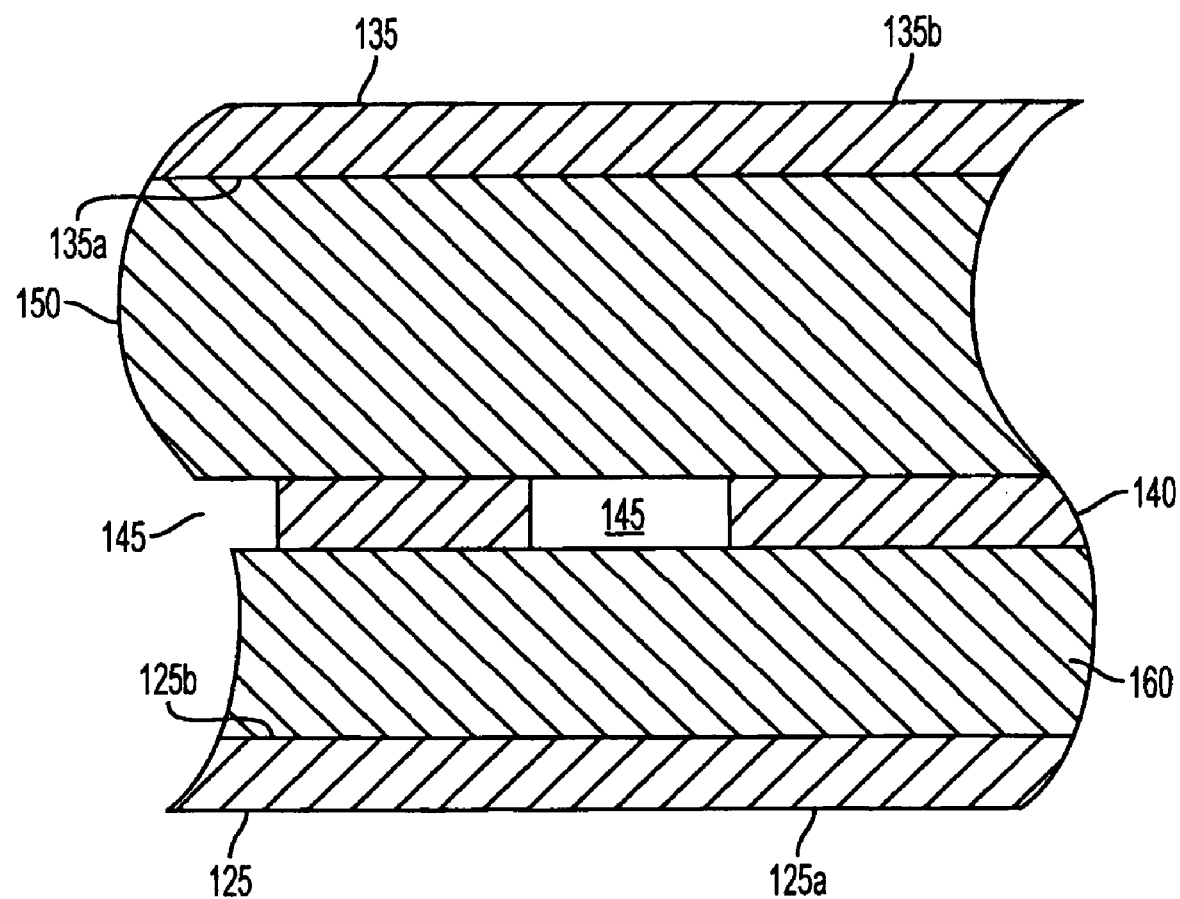
FIG. 2A is a cross-sectional elevation of the bottom of the vessel showing the inner and outer pans as well as the materials used to form the thermally conductive bottom prior to friction bonding.
Figure 2B:
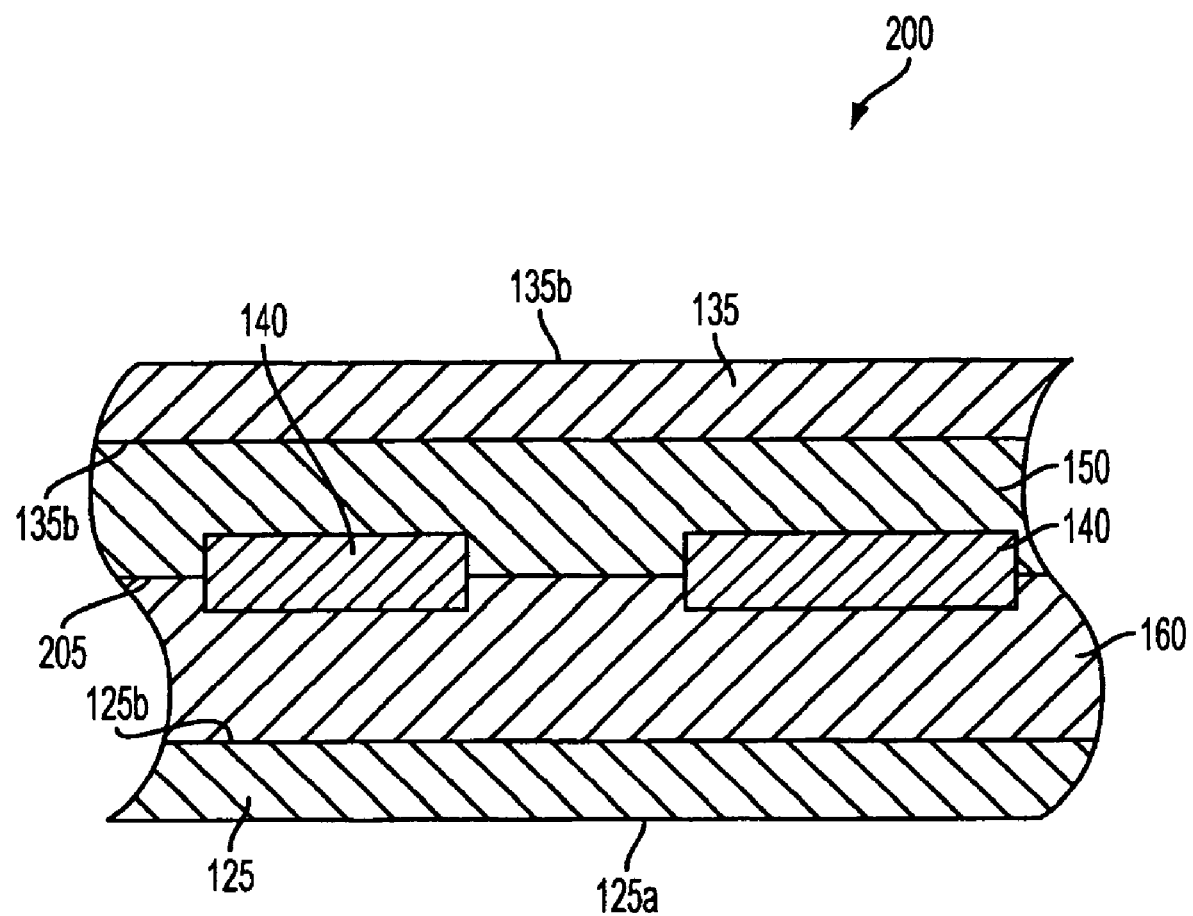
FIG. 2B illustrates the same region after friction bonding.

The method and result of friction bonding the inner and outer vessels is illustrated by the schematic expanded view of FIGS. 2A and 2B, which corresponds to region B in FIG. 1. Initially an aluminum plate 160 is disposed on the bottom surface 125b of the outer vessels 125. A copper layer in the form of a sheet or plate 140 is disposed on top of aluminum plate 160. A second aluminum plate 150 is then disposed on top of copper plate 140. Finally, the outer surface 135b of the bottom of vessel 201 is disposed on top of aluminum plate 150. As the copper plate 140 has a series perforations or holes to enhance the attachment with the surrounding aluminum plates 150 and 160, which are illustrated as a series of gaps 145.

As will be further described with respect to FIG. 3, upon impact or friction bonding of the assembly in FIG. 2A the gaps 145, caused by perforations in copper plate 140, are filled as the upper surface of aluminum plate 160 has become bonded or welded to the lower surface of aluminum plate 150 at interface 205. Both the upper 150 and lower aluminum plate 160 have are essentially welded or fused to the surrounding stainless steel layers 125b and 135b respectively by the friction bonding process. Both aluminum plates 150 and 160 are reduced in thickness due to the lateral flow caused by the impact bonding, the upper aluminum plate 150 is reduced in thickness more than the lower plate 160.

Figure 3C:
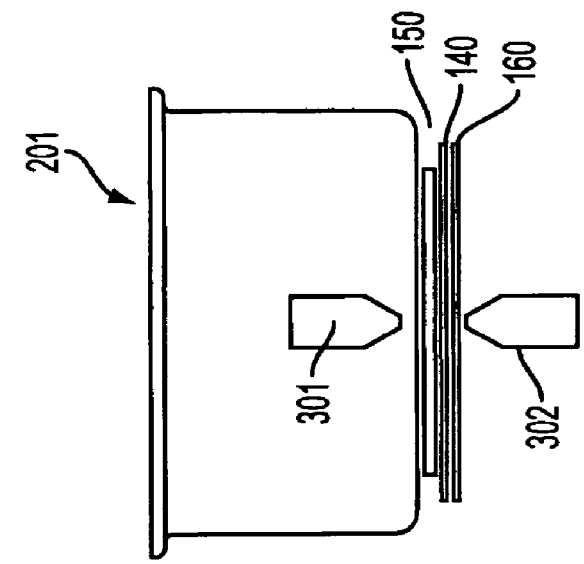
Figure 3B:
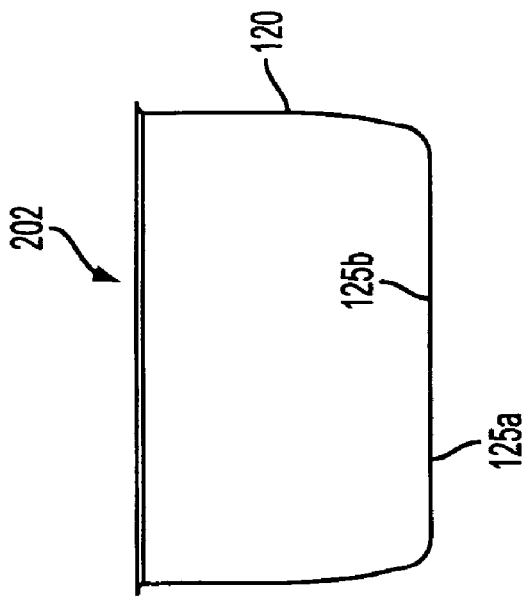
Figure 3A:
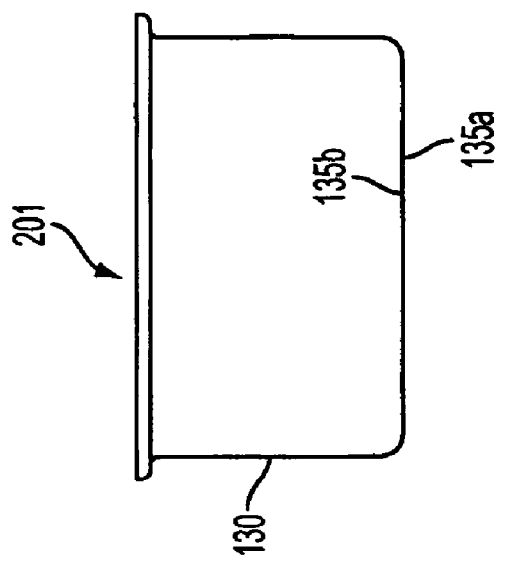

The preferred sequential steps used to construct a dual wall vessels from the two single wall vessels is illustrated in FIGS. 3A through 3G, inclusive. FIGS. 3A and 3B merely illustrate that the inner vessel 201 and outer vessels 202, which are initially formed of stainless steel by a drawing operation that shapes the inchoate rims 104 and 103 in shaping the upper portions proximal to the open end of each vessel.

In FIG. 3C the previously described assembly of the lower aluminum plate or layer 150, copper layer 140 and upper aluminum layer 160 are spot welded via electrodes 301 (disposed on the inside of the vessel 201, and electrode 302, contacting bottom of the lower aluminum layer 150, the assembly of layer being aligned with the center of vessel 201. Preferably, each of the aluminum plates and copper plate are substantially circular corresponding to the shape of the bottom of vessel s 201 and 202, however the upper aluminum plate 150 in addition to being about half the thickness of aluminum plate 160 in this preferred embodiment also has a smaller diameter owing to its greater propensity to flow during impact bonding process illustrated by FIG. 3E.

However, prior to impact bonding of the inner and outer vessels to the intervening aluminum copper layers, as shown in FIG. 3D, it is also preferable that the inner vessel 201 and outer vessel 202 are carefully co-axially aligns such that the inchoate rim 103 of outer vessel 202 is in contact with the inchoate rim 104 of inner vessel 201. This assembly is then stabilized by spot welding at the center of the bottom of vessels 201 and 202 a shown by the presence of inner electrode 301' and the outer electrode 302'. Thus the inner vessel 201 and outer vessel 202 is attached at the centers of their respective bottom portion 135 and 125 to aluminum later or plate 160, copper sheet 140 and aluminum plate 150.

In the step portrayed by FIG. 3E the inner and outer pans are impact or friction bonded to each after first pre-heating the assembly 300e to about 500° C. o, after which a forming mandrel contacting the inner bottom surface 135b is accelerated by a driven mass downward toward the support under the bottom surface 125a of vessel assembly 300E. As the aluminum layer having the lowest melting point of the material in the assembly and have been preheated to about 80% of its melting point, the friction and heat generated by the sudden impact causes the flow and fusion of the intervening aluminum layers to each other and the remainder of the contacting layers of the vessels not previously welded together to form strong bonds there between.

It should be noted in FIG. 3C that as upper aluminum layer 150 has a narrower diameter than both the copper layer 140 and the bottom aluminum layer 105 such that the force applied by the friction or impact bonding process results in a proportionately higher compressive stress on layer 150, thus causing it to extrude laterally and upward into cavity 105. As lower aluminum layer 160 also flows into cavity 105, generally surrounding and embedding copper layer 140, its flow terminates at substantially the same height as extruded aluminum layer 150 about the air-metal interface labeled 210 in FIG. 1B. Not wishing to be bound by theory, it is believed that the initial flow of layer 150 eventually equalizes the stress on both layers causing them to flow together into cavity 105. Also not wishing to be bound by theory, it is further believed that the initial and greater extrusion of layer 150 serves another purposes in that it facilitates the initial fusion bonding of layer 160 to the stainless steel bottom 125 at interface 125b, further stabilizing the friction bonding and flow of the other layers in a uniform and repeatable manner. As the fusion or friction bonding occurs in less than a fraction of a second the actual manner and operation of the invention is not certain, and hence was not readily predictable.

Figure 4:
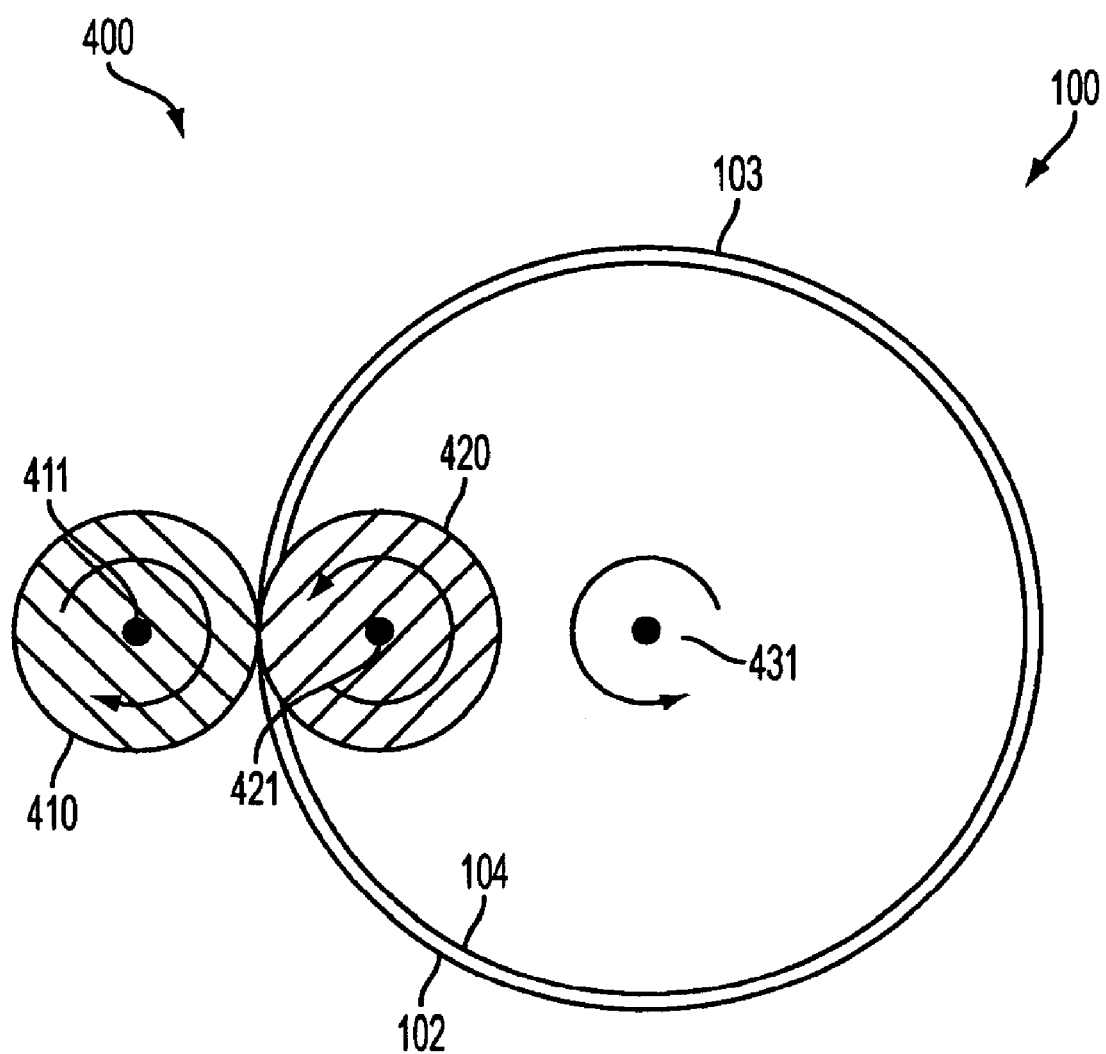
FIG. 4 is a plan view to further illustrate a preferred method of conducting the step of sealing the inner and outer wall rim portions by welding, corresponding to FIG. 3F.

After impact bonding as described with respect to FIG. 3E, the rim of the pan is formed in the steps illustrated by FIG. 3F and FIG. 4. In the first of a sequence of two steps, the now aligned and contacting inchoate rims of the inner 104 and outer wall 103 as welded by the electrode assembly and process illustrated further detail in FIG. 4. Counter rotating electrodes 410 and 420 substantially conform with the external shape of the inchoate rim surfaces formed during the drawing processes in the internal vessel 210 and external vessel 202 Illustrated in FIGS. 3A and 3B. Thus, complimentary shaped electrodes 400 and 420 rotating about their respective spindles 411 and 423 grasp the mating rim portion causing the rotation of the bonded assembly (which will form double wall vessel 100 shown in FIG. 3G) about its central axis 431, thus exposing the entire periphery of the rim to the welding electrodes 410 and 420. Therfore the entire periphery of the contact wall edges that form surface 103 and 104 in FIG. 1 are welded together. The welding operation thus seals cavity 105. In the second step, illustrated in FIG. 3F, the final rim shape of vessel 10 is formed by a circular cutting tool 310 that follows around the upper end of outer wall 120 of vessel 202 trimming an annulus through the weld to form the top edge 102 illustrated in FIG. 1. The thus completed double wall vessel 100 is illustrated in FIG. 3G.

It should be appreciated that the aluminum layers 160 and 150 are optionally laminates of multiple layers of thinner aluminum sheet with the outer layers being selected for their ability to adhere to stainless steel, copper, the adjacent aluminum layer encountered between the gaps in the copper sheet, or alternative materials used to formed the inner and outer vessels, or a substitute heat transfer layer for the copper sheet. In a preferred embodiment the lower aluminum sheet 160 is constructed of three layers of aluminum in which aluminum alloy 3003 is surrounded by layers of aluminum alloy 1050 to provide a total thickness of 6 mm. The outer aluminum layers in this laminate preferably have thickness of about 0.2 to 0.3 mm. The upper aluminum layer 150 is similarly of a three layer construction with aluminum alloy 3003 being surrounded by sheets of aluminum alloy 1050, however the initial thickness is preferably less, or about 3.5 mm. This construction is preferred as the 3003 aluminum alloy is harder than the surrounding 1050 aluminum alloys. However, it should be appreciated that the other metals may be substituted for the inner layer of 1003 aluminum layer. The copper layer preferably has a thickness of about 0.6 mm before impact bonding. The holes or gaps in the copper layer are preferably of a diameter of about 2 to 10 mm and cover less than about 30% of the area of the sheet. After impact bonding the upper aluminum layer 150 is reduced in thickness from its initial value of about 3.5 mm to about 1.5 mm. The lower aluminum layer or plate 160 undergoes a more limited reduction of thickness, from the initial value of 6 mm to about 3 mm. The copper layer is only slightly deformed from about 0.6 mm to 0.5 mm. The surrounding inner and outer vessel walls if fabricated from stainless steel do not undergo a substantial change thickness upon impact bonding, retaining their initial thickness of about 0.5 mm. Although the copper layer is preferably of comparable dimensions to the bottom of the inner and outer vessels, it may also extend into the cavity 105 there between, as it can be initially fabricated in a bowl like shape to conform to the intended cavity shape or, being significantly thinner than the surrounding aluminum layers, is readily deformed from a plate into a bowl like shape as the inner and outer vessel are nested together in FIG. 3D.

It should be appreciated that the outer surface of the outer vessel can have cladding or decorative layers outside of the stainless steel, for example one or more layers of external copper cladding optionally extends partly upward corresponding to the portion of the cavity that is filled with the aluminum layers during fusion or impact bonding. Such a contrasting external layer also serves a non-decorative function of alerting the consumer to the distinct thermal characteristics of the bottom portion of the pan, as opposed to prior art dual wall cooking vessels.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. A dual wall cooking vessel, the vessel comprising:
   a) an inner vessel having a bottom portion surrounded by vertical walls terminating at an inner rim to form an inner surface for containing fluids,
   b) an outer vessel having a bottom portion surrounded by vertical walls terminating at an outer rim to form an inner surface capable of containing fluids and surrounding the inner vessel,
   c) wherein the inner vessel is nested within the outer vessel such that the inner rim and the outer rim are concentrically aligned with each other, and a cavity is formed between the inner surface of the outer vessel and the outer surface of the inner vessel,
   d) a thermally conductive material interposed between the inner surface of the outer vessel and the outer surface of the inner vessel, said material bonding the inner and outer vessel together, and extending continuously over the horizontal bottoms of the inner and outer vessel and upward to partially fill a vertical portion of the cavity adjacent to the bottom portion of each of said inner and said outer vessel, wherein a cavity remains in the vertical space between the vertical walls of the inner and outer vessel above the partially filled portion.

2. A dual wall cooking vessel according to claim 1 wherein the inner and outer rim are in contact and welded together to form a substantially hermitic cavity.

3. A dual wall cooking vessel according to claim 1 wherein the rim of the inner vessel flairs outward in a substantially vertical direction and includes a concave upward facing portion for receiving a the mating edge of a cover for the cooking vessel.

4. A dual wall cooking vessel according to claim 3 further comprising a cover that mates with the concave upward portion of the rim to form a waterless cooking vessel.

5. A dual wall cooking vessel according to claim 1 wherein the thermally conductive material comprises one or more layers of aluminum or an alloy thereof.

6. A dual wall cooking vessel according to claim 1 wherein the thermally conductive material comprises a copper sheet interposed between two or more layers of aluminum or an alloy thereof.

7. A dual wall cooking vessel according to claim 6 wherein the wherein the copper sheet is perforated and the aluminum layers extend through the perforations to encapsulate the copper sheet.

8. A dual wall cooking vessel according to claim 5 wherein the aluminum layers have a combined thickness of at least about 3 mm.

9. A dual wall cooking vessel according to claim 1 wherein the thermally conductive material comprises a copper sheet interposed by two laminated sheets of aluminum, each laminate aluminum sheet comprising:
   a) a hard aluminum alloy inner layer,
   b) two layers of a softer aluminum or an alloy thereof surrounding the hard aluminum inner layer.

10. A dual wall cooking vessel according to claim 1 wherein the inner vessel is fabricated from stainless steel.

11. A dual wall cooking vessel according to claim 1 wherein the outer vessel is fabricated from stainless steel.

12. A dual wall cooking vessel, the vessel comprising:
a) an inner vessel having a bottom portion surrounded by vertical walls terminating at an inner rim to form an inner surface for containing fluids, the vertical wall comprising a single layer of metal,
b) an outer vessel having a bottom portion surrounded by vertical walls terminating at an outer rim to form an inner surface capable of containing fluids and surrounding the inner vessel,
c) wherein the inner vessel is nested within the outer vessel such that the inner rim and the outer rim are concentrically aligned with each other, and a cavity is formed between the inner surface of the outer vessel and the outer surface of the inner vessel,
d) a thermally conductive material interposed between the inner surface of the outer vessel and the outer surface of the inner vessel, said thermally conductive material bonding the inner and outer vessel together, wherein said bonding material has;
  i) a first portion extending and completely filling the space between the bottoms of the inner and outer vessel, and
  ii) a second portion extending from the first portion to partially fill the vertical portion of the cavity between the inner and the outer vessel wherein a cavity remains above the second portion, the cavity extending above the second portion to the upper rim of the vessel.

13. A dual wall cooking vessel according to claim 12 wherein the inner and outer rim are in contact and welded together to form a substantially hermitic cavity.

14. A dual wall cooking vessel according to claim 12 wherein the rim of the inner vessel flairs outward in a substantially vertical direction and includes a concave upward facing portion for receiving a the mating edge of a cover for the cooking vessel.

15. A dual wall cooking vessel according to claim 14 further comprising a cover that mates with the concave upward portion of the rim to form a waterless cooking vessel.

16. A dual wall cooking vessel according to claim 12 wherein the thermally conductive material comprises one or more layers of aluminum or an alloy thereof.

17. A dual wall cooking vessel according to claim 12 wherein the thermally conductive material includes at least a portion of a copper sheet interposed between the two or more layers of aluminum.

18. A dual wall cooking vessel according to claim 6 wherein the wherein the copper sheet is contiguous with and extends completely across the adjacent aluminum layers.

19. A dual wall cooking vessel according to claim 5 wherein the aluminum layers have a combined thickness of at least about 3 mm.

20. A dual wall cooking vessel according to claim 12 wherein the thermally conductive material comprises a copper sheet interposed by two laminated sheets of aluminum, each laminate aluminum sheet comprising:
a) a hard aluminum alloy inner layer,
b) two layers of a softer aluminum or an alloy thereof surrounding the hard aluminum inner layer.

21. A dual wall cooking vessel according to claim 12 wherein the inner vessel is fabricated from stainless steel.

22. A dual wall cooking vessel according to claim 12 wherein the outer vessel is fabricated from stainless steel.

* * * * *